3,412,164
PREPARATION OF BUTENYL CYCLOHEXENES
Wolfgang Schneider, Broadview Heights, Ohio, assignor to The B. F. Goodrich Company, New York, N.Y., a corporation of New York
No Drawing. Filed Oct. 20, 1966, Ser. No. 587,955
1 Claim. (Cl. 260—666)

ABSTRACT OF THE DISCLOSURE

Butenyl cyclohexene is prepared by codimerizing ethylene with vinyl cyclohexene in the presence of a catalyst of a nickel salt and an alkyl aluminum or alkyl aluminum halide compound, alternatively in the presence of an electron donor.

---

This invention relates to an improved method for preparing butenyl cyclohexenes.

Butenyl cyclohexene is readily prepared by dimerizing ethylene with vinyl cyclohexene in accordance with this invention in improved yields by reacting ethylene with vinyl cyclohexene in the presence of a nickel salt mixed with an alkyl aluminum compound.

The nickel compounds include salts of organic and inorganic acids, for example, nickle bromide, nickel chloride, nickel iodide, nickel sulfate, nickel oxalate, nickel acetate; nickel acetylacetonate and the like, or other chelates, in which the nickel atom is attached to two functional groups of a molecule by a main valence bond and coordinatively.

The aluminum compounds include aluminum alkyls of the formula $AlR_3$ and alkyl aluminum halides of the formula $R_{(1-2)}AlX_{(2-1)}$ wherein X is chlorine or bromine and R is an alkyl radical and the alkyl radical contains 2 to 12 carbon atoms, preferably 2 to 8, and $R+X=3$. Typical compounds include triethyl aluminum, tributyl aluminum, dialkyl aluminum halides and alkyl aluminum dihalides as ethyl aluminum dichloride, dipropyl aluminum chloride, diisobutyl aluminum chloride, butyl aluminum dichloride, dihexyl aluminum bromide, ethyl aluminum sesquichloride and the like.

The catalyst combination must include Al, Ni and a halide, for example, an aluminum trialkyl and a nickel halide; an aluminum alkyl, an alkenyl halide and a nickel salt; a nickel salt and an aluminum alkyl halide and the like.

The amount of the two catalyst components used may be varied from about 0.0001 to 10 millimols, preferably about 0.001 to 1, per mol of olefins, in a molar ratio of greater than one mol of alkyl aluminum halide per mole of nickel up to a molar ratio of 10 to 1.

The catalyst may be prepared by adding the components separately to a reactor, preferably either in the ethylene or vinylcyclohexene or in an inert solvent such as benezene or toluene. Any of the catalyst components may be charged first and the others added gradually thereto while stirring the entire reaction mixture. This reaction mixture, prepared in situ or separately, is heated in the presence of the olefins preferably at a temperature of about −20° C. to 150° C., preferably 10° C. to 60° C. The reaction is conducted under sufficient pressure to keep the reactants in liquid state. This will depend on the temperature of reaction. After the reaction any excess alpha-olefin is removed and the product distilled to isolate the desired products.

The catalyst may also contain additional electron donors if desired. Such materials known to those skilled in the art include, for example, tributyl phosphine, triphenyl phosphine, triisooctyl phosphine, crotyl chloride, 2-bromopropene-1, 1-bromopropene-1, 3-chloro-2-methyl propene, 3-chloropropene, 1-chloropropene-1, 2-chloropropene-1, 3-chloropropene-1, 2-chlorobutene-2, and the like. Preferred are halogen-containing olefins, preferably containing 2 to 8 carbon atoms and chlorine or bromine. The amount of electron donor used may be varied quite widely but normally is in the range of about 0.01 to 100 millimols per mol of olefin, more preferably about 0.1 to 25 millimols.

Example 2 grams (9 millimols) of nickel bromide and 1.76 ml. (18 millimols) of 3-chloro-2-methyl-propene were added to 70 grams of cyclohexene in an oxygen- and moisture-free reactor. 4.5 grams of diisobutyl aluminum chloride in 20 grams of vinyl cyclohexene were slowly added to the reactor with stirring. The resulting catalyst was charged to an autoclave which was purged with argon, sealed and pressured with 50 grams of ethylene. After several hours at ambient temperature, the pressure was released and the product distilled off. The product distribution obtained was 52% 4(1-butenyl)cyclohexene, 4% 4(alpha-methylene propyl)cyclohexene, 10% 4-ethylidene cyclohexene and 34% 4-vinyl cyclohexene. This reaction was then repeated with 18 millimols of 1,4-dichlorobutene-2 and the product distribution obtained was 52% 4(1-butenyl) cyclohexene, 12% 4(alpha-methylene propyl)cyclohexene, 17% 4-ethylidene cyclohexene and 19% 4-vinyl cyclohexene. When the example is repeated in the absence of the chloro-olefin, good yields of butenyl cyclohexene are obtained.

The 4(1-butenyl) cyclohexene is readily isomerized by known methods to 4(3-butenyl)cyclohexene which then can be interpolymerized with ethylene or ethylene and propylene with a reduced titanium or Ziegler type catalyst to provide a sulfur-curable elastomer.

I claim:
1. The method for preparing butenyl cyclohexene comprising contacting ethylene and vinyl cyclohexene with a catalyst consisting essentially of about 0.001 to 10 millimols of a nickel halide selected from the group consisting of nickel chloride and nickel bromide and an alkyl aluminum halide of the formula $R_{1-2}AlX_{2-1}$ wherein R is an alkyl radical containing 2 to 8 carbon atoms, X is a halogen selected from the group consisting of chlorine and bromine and $R+X=3$, the millimols of nickel halide and alkyl aluminum halide being based on a mol total of ethylene and vinyl cyclohexene, said alkyl aluminum halide and nickel halide being present in a molar ratio of from greater than 1 to 10 mols of alkyl aluminum halide per mole of nickel halide, and a halogen-containing olefin selected from the group consisting of 2-bromopropene-1, 1-bromopropene-1, 3-chloro-2-methyl propene, 3-chloropropene, 1-chloropropene-1, 2-chloropropene-1, 3-chloropropene-1, and 2-chlorobutene-2 present in amount from about 0.01 to 100 millimols per mol total of ethylene and vinyl cyclohexene.

References Cited

UNITED STATES PATENTS 2,969,408   1/1961   Nowlin et al. _____ 260—683.15

DELBERT E. GANTZ, *Primary Examiner.*

V. O'KEEFE, *Assistant Examiner.*